United States Patent
Baily et al.

(10) Patent No.: US 12,504,086 B2
(45) Date of Patent: Dec. 23, 2025

(54) PNEUMATIC CONNECTOR ASSEMBLY, INFLATABLE MATTRESS AND PATIENT SUPPORT APPARATUS

(71) Applicant: Arjo IP Holding Aktiebolag, Malmö (SE)

(72) Inventors: Greg Baily, South Glamorgan (GB); Clive Goodfield, Mid Glamorgan (GB); Ryan William Harrison, Mid Glamorgan (GB); Philip James Jackson, South Glamorgan (GB)

(73) Assignee: Arjo IP Holding Aktiebolag, Malmö (SE)

( * ) Notice: Subject to any disclaimer, the term of this patent is extended or adjusted under 35 U.S.C. 154(b) by 103 days.

(21) Appl. No.: 18/571,759

(22) PCT Filed: Jun. 10, 2022

(86) PCT No.: PCT/SE2022/050568
§ 371 (c)(1),
(2) Date: Dec. 19, 2023

(87) PCT Pub. No.: WO2023/277759
PCT Pub. Date: Jan. 5, 2023

(65) Prior Publication Data
US 2024/0288084 A1    Aug. 29, 2024

(30) Foreign Application Priority Data
Jun. 28, 2021   (SE) .................................. 2150821-3

(51) Int. Cl.
*F16K 24/00*        (2006.01)
*A61G 7/057*        (2006.01)

(52) U.S. Cl.
CPC .......... *F16K 24/00* (2013.01); *A61G 7/05776* (2013.01)

(58) Field of Classification Search
CPC ............................ F16K 24/00; A61G 7/05776
See application file for complete search history.

(56) References Cited

U.S. PATENT DOCUMENTS

2015/0000044 A1   1/2015   Morimura et al.
2020/0268163 A1   8/2020   Duvert et al.

FOREIGN PATENT DOCUMENTS

EP            3448343 B1    3/2021

OTHER PUBLICATIONS

International Search Report and Written Opinion dated Sep. 12, 2022, issued in corresponding International Patent Application No. PCT/SE2022/050568.

*Primary Examiner* — Paul J Gray
(74) *Attorney, Agent, or Firm* — Morgan, Lewis & Bockius LLP

(57) ABSTRACT

Present invention relates to pneumatic connector assembly for pneumatically coupling a pressure source and an inflatable mattress or controlling the inflation and/or deflation of said inflatable mattress.

13 Claims, 5 Drawing Sheets

PNEUMATIC CONNECTOR ASSEMBLY, INFLATABLE MATTRESS AND PATIENT SUPPORT APPARATUS

TECHNICAL FIELD

Present invention relates to a pneumatic connector assembly for pneumatically coupling a pressure source and an inflatable mattress, an inflatable mattress and a patient support apparatus comprising an inflatable mattress.

BACKGROUND

In recent years, inflatable mattresses have come into extensive use and are used widely in hospitals to prevent and treat decubitus ulcers which are commonly referred to as bedsores. A primary cause of bedsores is the inability of the patient to move to relieve pressure points. These pressure points typically occur in the area of a bony protuberance which results in a cut-off of the blood flow in the skin and soft tissue adjacent to the protuberance when distortion of capillary beds curtails blood flow. When the blood flow in the capillaries is blocked due to excessive external (interface) pressure, the cells in that area begin to die and may result in a wound, which is called a bedsore. Mobile persons do not have this problem because they continually move even when asleep which eliminates the cut-off of blood flow for too long a period.

A typical inflatable mattress has a plurality of parallel gas or vapor-permeable cells inflated to provide support for the patient. The inflatable mattress provides gradual leakage of air from the cells, either by having holes at selected locations or by providing a cell material which is permeable to air.

The pressure of the cells may be alternated sequentially to provide active therapy against bed sores in an active therapy mode of the inflatable mattress. In a passive mode where no therapy is active the pressure of the cells of the mattress may be maintained by valves and air intake from the atmosphere. In the active mode the alternating of the pressure of the cells is maintained by means of a pressure source supplying or discharging air. Switching between the active and passive mode of the inflatable mattress requires manual intervention and ensuring that the pressure source is properly connected. Furthermore, there is a risk for air leakage through ports of the mattress, which are not active during the active and passive mode, respectively. This may negatively affect the performance of the mattress.

Present inventors have realized there is need for improvements within this field.

SUMMARY

According to an aspect, a pneumatic connector assembly for pneumatically coupling a pressure source an inflatable mattress for controlling the inflation and/or deflation of the inflatable mattress is provided.

The pneumatic connector assembly comprises a pressure source connector part adapted to be connected to the pressure source and an inflatable mattress connector part adapted to be connected to the inflatable mattress. The pressure source connector part and mattress connector part are connectable to provide an air pathway through the pneumatic connector assembly in an engaged state.

The mattress connector part comprises a first mattress port and second mattress port. The first and second mattress port is adapted to a first and second connection of a first air line of the inflatable mattress, respectively. The first and second mattress port are adapted to provide an outlet and inlet to the atmosphere for the first air line when the pneumatic connector assembly is in a non-engaged state.

The mattress connector part further comprises a third mattress port and a fourth mattress port. The third and fourth mattress port are adapted to be connected to a first and second connection of a second air line of the inflatable mattress, respectively.

The pressure source connector part comprises a first pressure source port and second pressure source port adapted to be connected to the third mattress port and fourth mattress port, respectively. The pressure source connector part further comprises a blocking arrangement, which in the engaged state of the pneumatic connector assembly is arranged to block the first mattress port and second mattress port thereby blocking the air pathway to and from the atmosphere.

According to an aspect, a patient support apparatus is provided. The patient support apparatus comprises an inflatable mattress and a pneumatic connector assembly according to the above. The inflatable mattress comprises a plurality of inflatable cells interconnected by means of the first and/or second air line.

According to an aspect, an inflatable mattress is provided. The inflatable mattress comprises a plurality of inflatable cells. The inflatable cells comprises air circuitry connected to the inflatable cells of the first support zone for controlling the inflation and/or deflation of the inflatable cells of the first support zone. The air circuitry comprises ports adapted to be connected to an air supply.

The inflatable mattress further comprises a second support zone air line separate from the air circuitry. The second support zone air line interconnects the inflatable cells of the second support zone. The second support zone air line comprises an inlet and an outlet. An inlet one-direction valve is provided at the inlet arranged to allow air passage from the atmosphere. In addition, an outlet one-direction valve and a flow restricting element are provided at the outlet for controlling air release from the outlet.

According to an aspect, a patient support apparatus is provided. The patient support apparatus comprises an inflatable mattress according to the above and a pressure source connected to the air circuitry by means of the ports.

According to an aspect an inflatable mattress is provided. The inflatable mattress comprises a plurality of inflatable cells, an air supply interface and air circuitry interconnecting the plurality of inflatable cells.

The air supply interface comprises a first mattress port connected to an inlet of the air circuitry. The air supply interface further comprises a second mattress port connected to an exhaust of the air circuitry.

The air supply interface comprises a third mattress port connected to the air circuitry and a fourth mattress port connected to the air circuitry.

The inflatable mattress is configured to operate in a first mode in which the third and fourth mattress port are sealed and wherein the air is supplied to and released from the inflatable cells by means of the first and second mattress port.

The inflatable mattress is further configured to operate in a second mode in which the first and second mattress port are sealed and wherein the air is supplied to and released from the inflatable cells by means of the third and fourth mattress port.

According to an aspect, a patient support apparatus is provided. The patient support apparatus comprises an inflatable mattress according to the above and a pressure source connected to the third and fourth mattress port for controlling the applied pressure to the first and second group of inflatable cells in the second mode.

According to an aspect, a method for inflating the inflatable mattress of the patient support apparatus according to the above is provided. The method comprises switching from the first mode to the second mode by sealing of the first and second mattress port and opening the third and fourth mattress port. The method further comprises supplying air to and releasing air from the plurality of inflatable cells in the second mode via the third and fourth mattress port.

Further objects and features of the present invention will appear from the following detailed description of embodiments of the invention.

BRIEF DESCRIPTION OF DRAWINGS

The invention will be described with reference to the accompanying drawings, in which.

DETAILED DESCRIPTION

Figure 1:
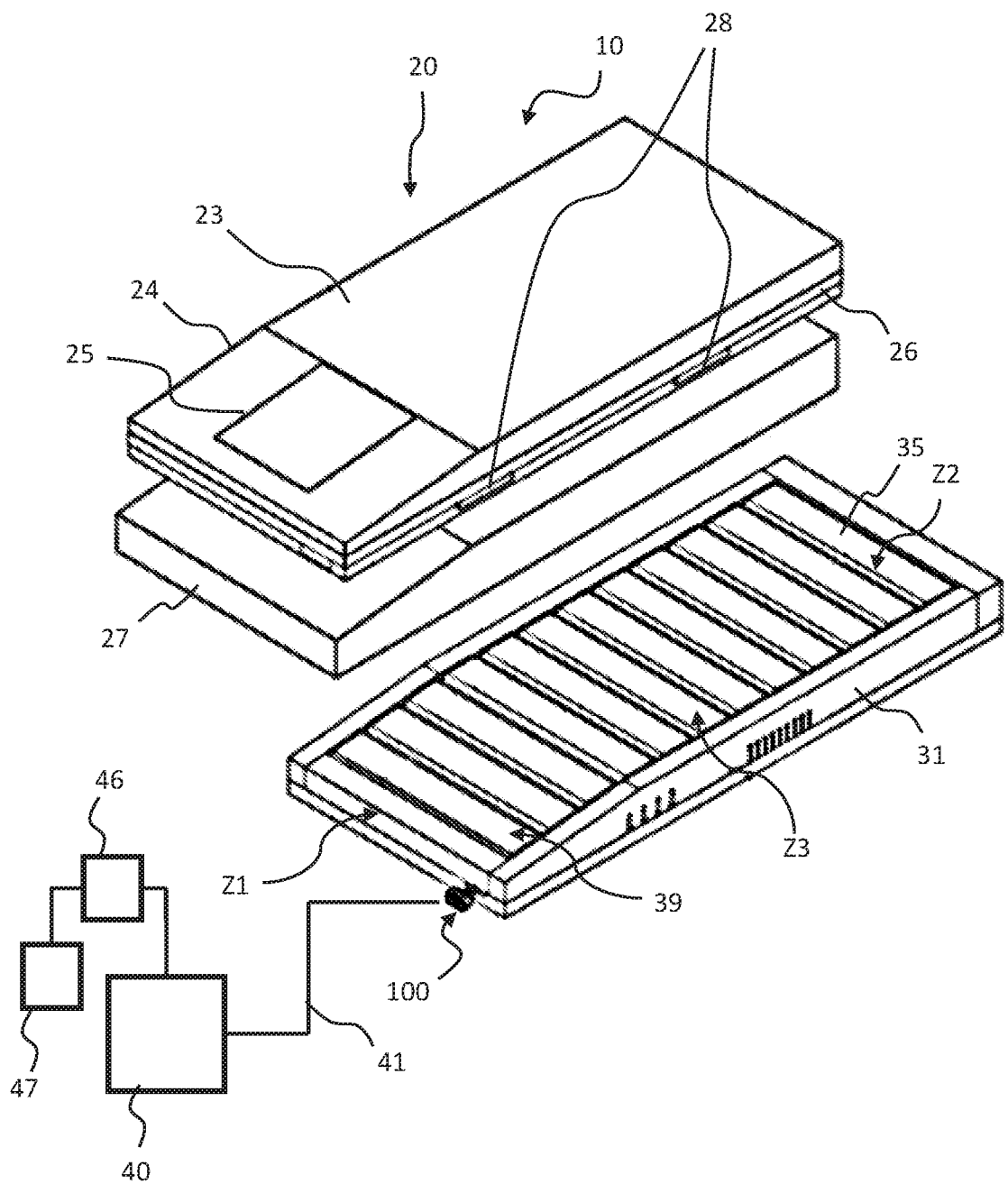
FIG. 1 is a perspective view of a patient support apparatus according to an embodiment.

FIG. 1 schematically depicts a patient support apparatus according to an embodiment of the present invention. The patient support apparatus comprises a pressure source 40 and an inflatable mattress 10. The inflatable mattress comprises a plurality of inflatable cells 35.

As depicted in FIG. 1, the inflatable cells 35 may form a plurality of support zones. The support zones may be arranged to support different body parts of a patient supported by the inflatable mattress 10. Accordingly, the plurality of inflatable cells 35 may form a first support zone Z1 and a second support zone Z2. As will be described in further detail below, additional support zones may be formed by said plurality of inflatable cells or by additional inflatable cells.

The first support zone Z1 may form a heel support zone. The first support zone Z1 is thus arranged to support the heels of a patient supported by the inflatable mattress 10.

The second support zone may Z2 may form a head support zone. The second support zone Z2 is thus arranged to support the head of a patient supported by the inflatable mattress 10.

In one embodiment, the first support zone may form both a heel support zone and a torso support zone.

In one embodiment, the inflatable cells 35 may form a third support zone Z3. The third support zone Z3 may form a torso support zone. The third support zone Z3 is thus arranged to support the torso of a patient supported by the inflatable mattress 10.

The first, second and third support zone may be extending transversally relative the length of the inflatable mattress 10. The first, second and third support zone may be arranged adjacent to each other in sequence along the length of the inflatable mattress 10.

Preferably, the inflatable cells 35 are filled with foam. The inflatable cells 35 may thus comprise a foam core. The foam core may have comprise a plurality of foam materials. Preferably, an upper portion of the foam core may be in a viscoelastic foam and a lower portion foam core may be in a different foam material, i.e. a conventional foam material. The differing properties of the foam materials allows for optimisation of the pressure redistribution in the cell. The upper portion may thus comprise a viscoelastic type of foam for promoting patient comfort. The bottom part may comprise a sturdier foam material, adapted to prevent heavier patients from contacting the bed deck. In one embodiment, the foam core may have a layered structure where at least one layer is in a viscoelastic foam and at least one layer is in another foam material.

The inflatable cells 35 further have a cell outer. Preferably, the cell outer may also be in a polymeric material such as polyurethane. The cell outer may be formed by a welded sheet.

The pressure source 40 may be considered a source of pressurized air. The pressure source 40 may comprise a pump system. The pump system may comprise a pump. The pump may be connected to ports in the inflatable mattress. The pump system may comprise a single pump or multiple pumps. Each of the pumps may comprise a compressor. The single pump or multiple pumps may each comprise a compressor. Worded differently, the pressure source may comprise one or more compressors or air movers.

The pressure source 40 may be connected, i.e. pneumatically connected, to the mattress via a pressure source connection 41. The pressure connection 41 may include a pneumatic connector assembly, which will be described in further detail with reference to FIG. 6-8.

Further referencing FIG. 1, an exterior view and partial cross-section views of the inflatable mattress 10 are depicted.

The inflatable mattress 10 may comprise a cell cover 27. The cell cover 27 is arranged to cover the inflatable cells 35. The cell cover 27 may be in a fire-retardant material for protecting the pneumatic system and inflatable cells from effects of fire.

The inflatable mattress 10 may comprise an outer cover 23 forming an outer surface of the inflatable mattress 10. The outer cover may be in a non-air permeable material to minimize the potential for fluid ingress into the inflatable mattress. The inflatable cells 35 may thus be arranged inside said outer cover 27.

The outer cover 23 may comprise a top portion and a bottom portion joined to form said outer cover 23. In one embodiment, the bottom portion and the top portion may be joined by a zipper to allow for replacement of the top portion. In one embodiment, the bottom portion may be in an anti-slip material for achieving adhesion between the bottom portion and the bedframe.

As further depicted in FIG. 1, the outer cover 23 may be provided with carrying handles 28 for transportation and lifting of the inflatable mattress 10.

Again referencing FIG. 1, the inflatable mattress 10 may further comprise a cell support structure 31. The cell support structure 31 may be in a foam material. The inflatable cells 35 may be arranged in said cell support structure 31. In one embodiment, the transversal ends of the inflatable cells 35 may be mounted to the cell support structure 31. In one embodiment, the inflatable cells 35 may arranged on top of the cell support structure 31. In one embodiment, the cell cover 27 may be arranged to cover the cell support structure 31.

In one embodiment, the cell support structure 31 may be arranged on top of the inflatable cells. In one embodiment, the cell support structure may form a sloped heel section of the inflatable mattress.

The patient support apparatus depicted in FIG. 1 may be provided with air circuitry, aspects of which further being depicted in FIG. 2-5.

Figure 2:
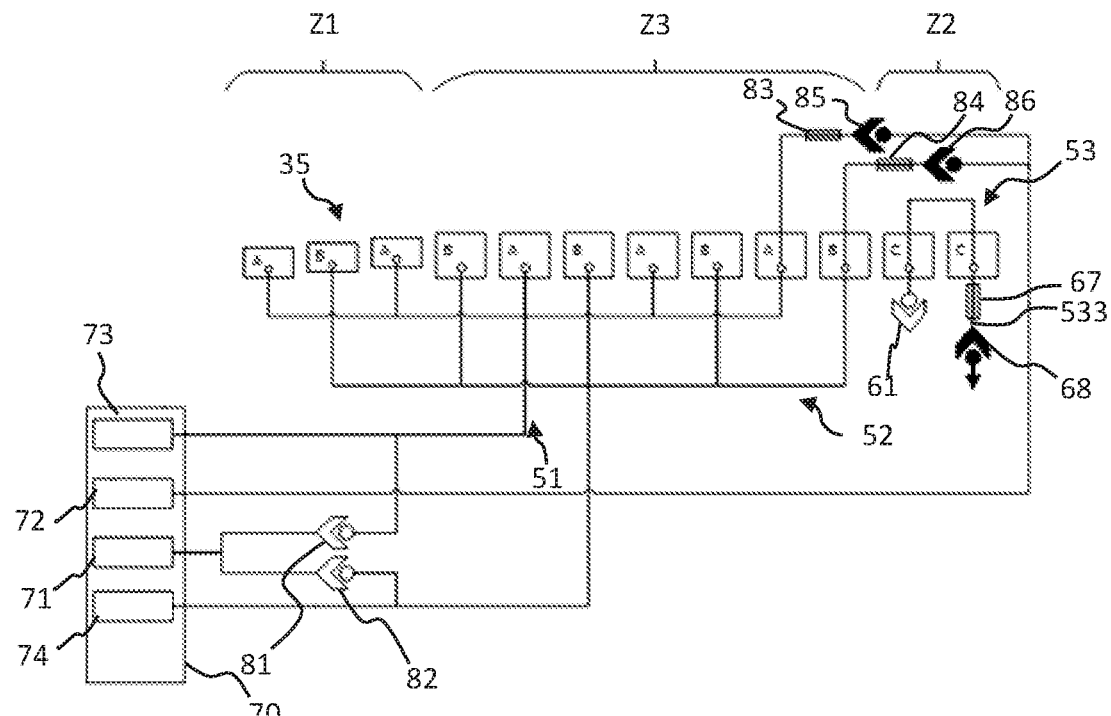
FIG. 2 is a schematic view of the air circuitry of an inflatable mattress according to an embodiment.
Figure 3:
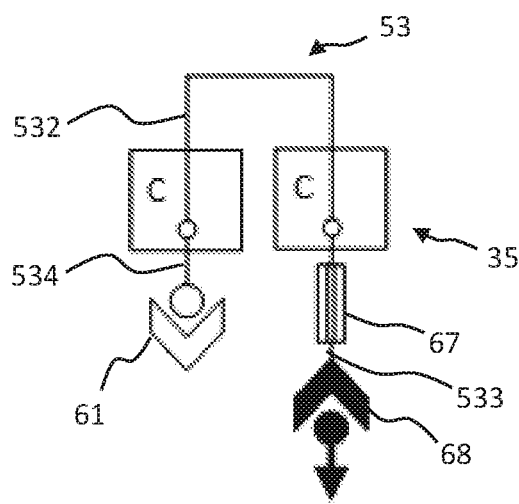
FIG. 3 is schematic view of a part of the air circuitry of an inflatable mattress according to an embodiment.
Figure 4:
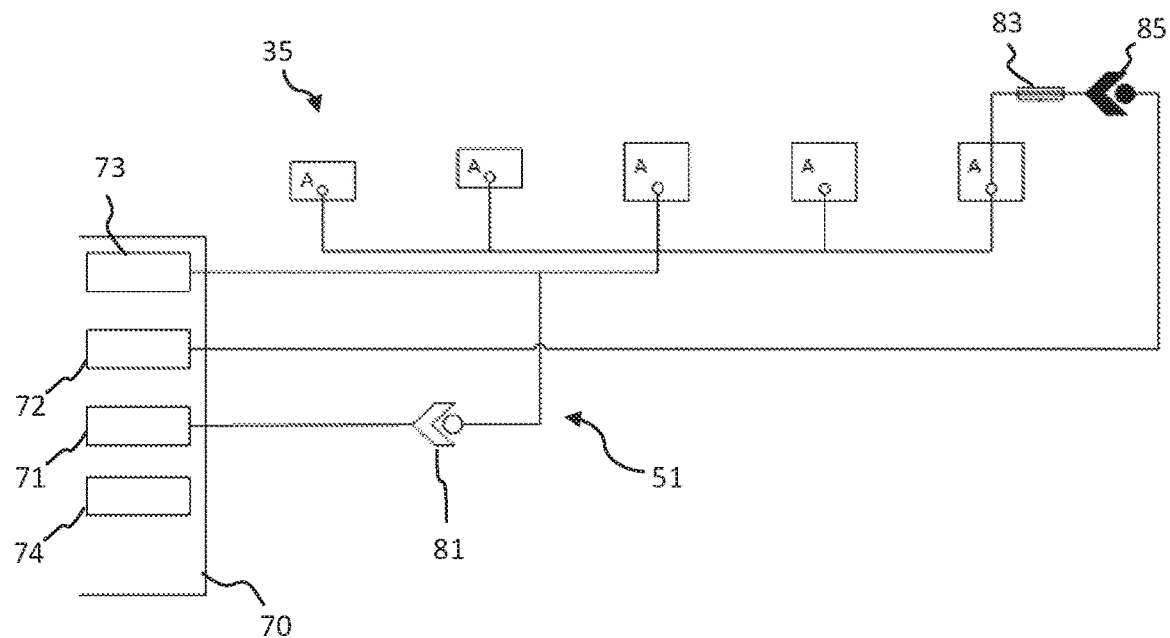
FIG. 4 is a schematic view of a part of the air circuitry of an inflatable mattress according to an embodiment.
Figure 5:
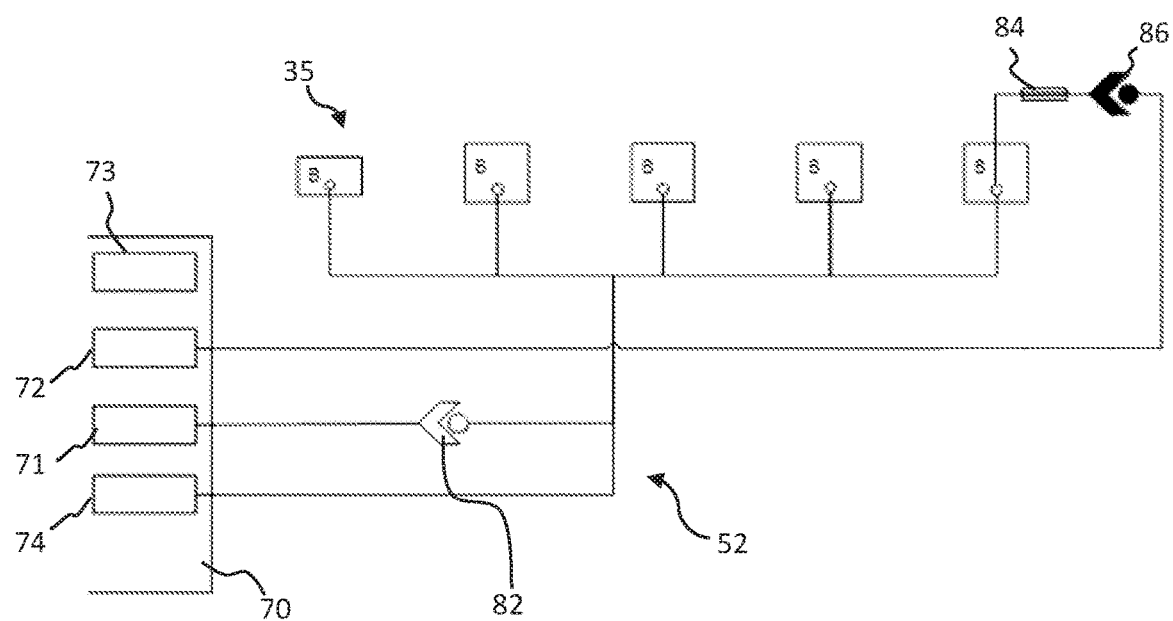
FIG. 5 is a schematic view of a part of the air circuitry of an inflatable mattress according to an embodiment.

FIG. 2 depicts a schematic view of the air circuitry according to embodiments of the present invention and FIG. 3-5 depicts schematic views of parts of said air circuit. The inflatable cells 35 forms the first and the second support zone Z1, Z2. The inflatable mattress 10 comprises air circuitry 51, 52 connected to the inflatable cells 35. The air circuitry 51, 52 may be connected to the inflatable cells 35 of the first support zone Z1 for controlling the inflation and/or deflation of the inflatable cells 35 of the first support zone Z1. The air circuitry comprises ports 73, 74 adapted to be connected to an air supply. An air supply herein refers to a supply of air for inflating or deflating the inflatable cells 35. The air supply may be the pressure source depicted in FIG. 1. In an alternative embodiment, the air supply may be the atmosphere, i.e. the air surrounding the inflatable mattress or the atmospheric air. Preferably, said ports 73, 74 are adapted to be connected to the pressure source 40 (depicted in FIG. 1).

Notably, an air line herein refers to an air circuit line, i.e. an air conduit adapted to fluidly connect different components. The air line may be in the form of a tube or a hose or a pipe.

Similarly, air circuitry herein refers to an air line system, .e.g. an air circuit system. An circuitry may comprise several interconnected or separate air lines.

As seen in FIG. 2 and depicted in further detail in FIG. 3, the inflatable mattress 10 may comprise a second support zone air line 53. The second support zone air line 53 is separate from the air circuitry 51, 52. The second support zone air line 53 interconnects the inflatable cells of the second support zone Z2. The second support zone air line 53 thus fluidly connects said inflatable cells.

The second support zone air line 53 comprises an inlet 534 and an outlet 533. An inlet one-direction valve 61 is provided at the inlet 534. The one-direction valve 61 is arranged to allow air passage from the atmosphere. The second support zone air line 53 is further provided at the outlet 533 for controlling the air release from the outlet 533.

The inlet 534 and the outlet 533 is thus arranged to be in air communication with the exterior atmosphere.

As is known to the skilled person a one-direction valve may be considered a uni-direction valve or a control valve adapted to only enable passing flow in one direction.

Having the second zone utilising a separate air connections relative to the remaining zones formed by the inflatable cells allows for individual control of the second zone. For example, above described design of the inflatable mattress allows for keeping a zone at a constant pressure by means of connections to the atmosphere even if the pressure in the other zones is actively controlled by the pressure source. Thereby, active control is disabled on parts of the mattress that are less desirable to subject to alternating pressure. Preferably, the second support zone Z2 forms the head support zone. This is particularly advantageous, since this allows for prevention of alternating pressure around the head of the patient without complex additional control means in the mattress. It is not desirable to alter the pressure around the head of the patient due to this resulting in discomfort.

In one embodiment, at least a number of the inflatable cells of the first support zone Z1 are arranged to form a downward slope along the length of the inflatable mattress 10 towards a heel end of the inflatable mattress 10. In one embodiment, the first support zone Z1 may be arranged to support both a torso and heels of a patient supported by the inflatable mattress. In an alternative embodiment, the inflatable mattress comprises the third support zone Z3 that may form a torso support zone.

As further depicted in FIG. 2, the air circuitry 51, 52 may be connected to the third support zone Z3 for controlling the inflation and/or deflation of the inflatable cells of said third support zone Z3.

Further referencing FIG. 3, the inlet one-direction valve 61 may be a non-return valve such as a membrane valve. The inlet one-direction valve 61 is arranged in fluid communication with the atmosphere via the inlet 534. The inlet one-direction valve 61 is arranged to prevent air discharge to the atmosphere via the inlet 534. The inlet one-direction valve 61 is further arranged to allow air passage from the atmosphere to the inlet 534.

The outlet one-direction valve 68 is arranged to prevent airflow from the outlet 533 to the inlet 534. The outlet one-direction valve 68 is arranged to control the air release from the outlet 533. The outlet one-direction valve 68 may be a check valve. The check valve is arranged to open at a threshold pressure and provide air passage out of the outlet 533.

The flow restricting element 67 may be any type of conventional flow restricting element. The flow restricting element 67 may be positioned upstream of the outlet one-direction valve 68 in the direction of inlet to outlet of the second support zone air line 53. The flow restricting element 67 is arranged to reduce the flow rate of the air passing through the outlet 533.

As depicted in FIG. 3, the second support zone air line 53 may comprise an interconnecting line section 532. Thus, the inlet 534 may be connected to a first inflatable cell of the second support zone and the outlet 533 may be connected to a second inflatable cell of the second support zone. The interconnecting line section 532 may connect the first and second inflatable cell. In one embodiment, at least one intermediate inflatable cell may be arranged between the first and second inflatable cell. The at least one intermediate inflatable cell may be connected to the first and second inflatable cell by means of the interconnecting line section 532.

According to an aspect, a patient support apparatus is provided. The patient support apparatus comprises the above described inflatable mattress 10 and the pressure source 40. The pressure source 40 is connected to the air circuitry 51, 52 by means of the ports 73, 74.

Again referencing FIG. 2 and depicted in further detail in FIGS. 4 and 5, the plurality of inflatable cells 35 comprises a first group of inflatable cells A and a second group of inflatable cells B. In one embodiment, the second support zone may comprise a group of inflatable cells C, said group of inflatable cells C may be interconnected by means of the second support zone air line 53 described above.

As depicted in FIG. 2, the first and second group of inflatable cells A, B may be sequentially arranged along the length of the inflatable mattress. The inflatable cells of the first and second group of inflatable cells A, B may extend transversely to the length of the inflatable mattress 10.

Preferably, the inflatable cells are arranged such that each inflatable cell of the first group of inflatable cells A is arranged adjacent to an inflatable cell of the second group of inflatable cells B. This is particularly advantageous when the inflatable mattress is in an alternating pressure mode since it allows for faster alternating of pressure in a desired area.

The inflatable mattress 10 may further comprise an air supply interface 70. The air supply interface may include the above described ports 73, 74. Thus, said ports may, as will be described further below, be considered a third and fourth mattress port 73, 74 of the air supply interface 70 of the inflatable mattress 10.

The inflatable mattress further comprises the air circuitry 51, 52. The air circuitry 51, 52 interconnects the plurality of inflatable cells 35.

The air supply interface 70 comprises a first mattress port 71. The first mattress port 71 is connected to an inlet of the air circuitry 51, 52. The air supply interface 70 comprises a second mattress port 72. The second mattress port 72 is connected to an exhaust of the air circuitry 51, 52.

The air supply interface 70 further comprises a third mattress port 73 connected to the air circuitry 51, 52 and a fourth mattress port 74 connected to the air circuitry 51, 52.

With the above described air circuitry the inflatable mattress allows for switching between different modes of operation. Thus, the inflatable mattress is configured to operate in a first mode and in a second mode.

In the first mode, the third and fourth mattress port 73, 74 are sealed. Further, in the first mode, air supplied to and released from the inflatable cells 35 by means of the first and second mattress port 71, 72.

In the second mode, first and second mattress port 71, 72 are sealed. Further, in the second mode, air is supplied to and released from the inflatable cells 35 by means of the third and fourth mattress port 73, 74.

This allows for simple switching between the first mode and the second mode simply by means of sealing and opening of the ports of the air supply interface.

The air circuitry 51, 52 may comprise a first air supply line 51 and a second air supply line 52. The first air supply line 51 interconnects the first group of inflatable cells A. The second air supply line 52 interconnects the second group of inflatable cells B.

The first mattress port 71 is connected to an inlet of the first air supply line 51, i.e. a first air supply line of the air circuitry. The first air supply line 51 interconnects the first group of inflatable cells A. The first mattress port 71 is further connected to an inlet of a second air supply line 52, i.e. a second air supply line of the air circuitry. The second air supply line 52 interconnects the second group of inflatable cells B.

The second mattress port 72 is connected to an exhaust of the first air supply line and second air supply line 51, 52.

The third mattress port 73 connected the first air supply line 51. The fourth mattress port 74 is connected the second air supply 52. The third mattress port 73 is connected to a connection of the first air supply line 51. Said connection may form an outlet/inlet of the first air supply line 51 between the inflatable cells and the third mattress port. The fourth mattress port 74 is connected to a connection of the second air supply line 52. Said connection may form an outlet/inlet of the second air supply line 52 between the inflatable cells and the fourth mattress port.

In the first mode, the third and fourth mattress port 73, 74 are sealed. Further, in the first mode, air is supplied to and released from the inflatable cells of the first and second group of inflatable cells A, B by means of the first and second mattress port 71, 72.

In the second mode, the first and second mattress port 71, 72 are sealed. Further, in the second mode, air is supplied to and released from the inflatable cells of the first and second group of inflatable cells A, B by means of the third and fourth mattress port 73, 74.

Each of the mattress ports may be formed by port connections. The port connections provides a fluid pathway between the air circuitry 51, 52 and the air supply interface 70.

Each of the second, third and fourth mattress port may be formed by a port connection. Thus, the port connection of the second mattress port 72 is connected to the exhaust of the first and second air supply line. The port connection of the third mattress port 73 is connected to the first air supply line. The port connection of the fourth mattress port 74 is connected to the second air supply line.

Although depicted with a single port connection, the skilled person recognizes that the first mattress port may be formed either by a single or a pair of port connections. Thus, the mattress port 71 may be formed by a single port connected to the first and second air supply line or by a first and second port connection connected to the first and second air supply line, respectively.

The air supply interface 70 may be provided as a single unit having each of the ports. As will be described with reference to FIGS. 6-8 the air supply interface may be provided in a mattress connector part. Alternatively, the air supply interface 70 may be in the form of separate ports arranged arbitrary positions at the inflatable mattress 10.

The first air line 51 comprises a manifold with a plurality of manifold lines, each connecting to an inflatable cell of the first group of inflatable cells A. One cell of the inflatable cells in the first group of inflatable cells is connected to an exhaust of the first air line 51 to lead expelled air from the first group of inflatable cells A towards the exhaust of the first air supply line.

The second air line 52 comprises a manifold with a plurality of manifold lines, each connecting to an inflatable cell of the second group of inflatable cells B. One cell of the inflatable cells in the second group of inflatable cells is connected to an exhaust of the first air line 52 to lead expelled air form the second group of inflatable cells B towards the exhaust of the second air supply line.

The exhaust may herein refer to a discharge portion of the air circuitry or the first and second air supply line. The discharged portion is arranged downstream of the inflatable cells relative the inlet of the air circuitry or first and second air supply line. The exhaust may comprise an exhaust or discharge portion of the first air supply line and an exhaust or discharge portion of the second air supply line. The discharge portion of the first and second air supply line may be jointly connected to the second mattress port 72.

The exhaust of the air circuitry 51, 52 may comprise at least one-direction valve 85, 86. In one embodiment, the exhaust may comprise a flow restricting element. The one-direction valve and/or flow restricting element are for, e.g. arranged to, control the release of air from the air circuitry 51, 52.

Thus, the exhaust of the first and second air supply line 51, 52 may comprise at least one-direction valve 85, 86 for controlling the release of air from the first and second air supply line 51, 52. The exhaust of the first and second air supply line 51, 52 may comprise at least one flow restricting element 83, 84 for controlling the release of air from the first and second air supply line 51, 52.

The one-direction valve 85, 86 may be a check valve. Said check valve is adapted to release air from the air circuitry 51, 52, e.g. the first and second supply air line 51, 52, when the pressure exceeds a threshold value. The one-direction valve 85, 86 is arranged downstream from the inflatable cells 35 and preventing flow from the exhaust towards the inflatable cells 35 from the exhaust.

In one embodiment, the second mode may considered an active mode of operation. Thus, the third and fourth mattress port 73, 74 are adapted to be connected to the pressure source. In the second mode, the inflation of the plurality of inflatable cells 35 are controlled by means of the pressure source 40 via the third and fourth mattress port 73, 74.

Accordingly, in the second mode, the inflation of the inflatable cells of the first and second group A, B is controlled by means of the pressure source 40 via the third and fourth mattress port 73, 74.

In one embodiment, the first mode may be considered a passive mode. Thus, the first mattress port 71 is adapted to provide an air inlet from the atmosphere and the second mattress port 72 is adapted to provide an air outlet to the atmosphere.

Thus, the present inflatable mattress allows for switching to a passive mode in a simple manner, i.e. by opening of the first and second mattress port and sealing of the third and fourth mattress ports. As will be further described with reference to FIGS. 6 to 8, it further enables control of the modes by means of connecting a pressure source connector to the air supply interface.

At least one one-direction valve 81, 82 may be provided at the first mattress port 71. The at least one one-direction valve 81, 82 being adapted to prevent air discharge from the air circuitry 51, 52 through the first mattress port 71. The at least one one-direction valve 81, 82 may be a check valve.

Referencing FIG. 2, at least one one-direction valve 81, 82 is provided at the first mattress port 71. The at least one one-direction valve 81, 82 is adapted to control the air intake of the first and second air supply line 51, 52 in the first mode. The at least one one-direction valve 81, 82 is adapted to prevent air discharge from the air circuitry 51, 52 through the first mattress port 71. Further referencing FIG. 2, the air circuitry 51, 52 may comprise a non-return valve 81 comprised in the first air supply line 51 and a non-return valve 82 comprised in the second air supply line 52.

The first and second group of inflatable cells A, B may together form the torso support zone and the heel support zone of the inflatable mattress 10. The first and second group of inflatable cells A, B may thus together form the first support zone Z1 and the third support zone Z3. The third group of inflatable cells C may form the head support zone. The third group of inflatable cells C may form the second support zone Z2.

Figure 6:
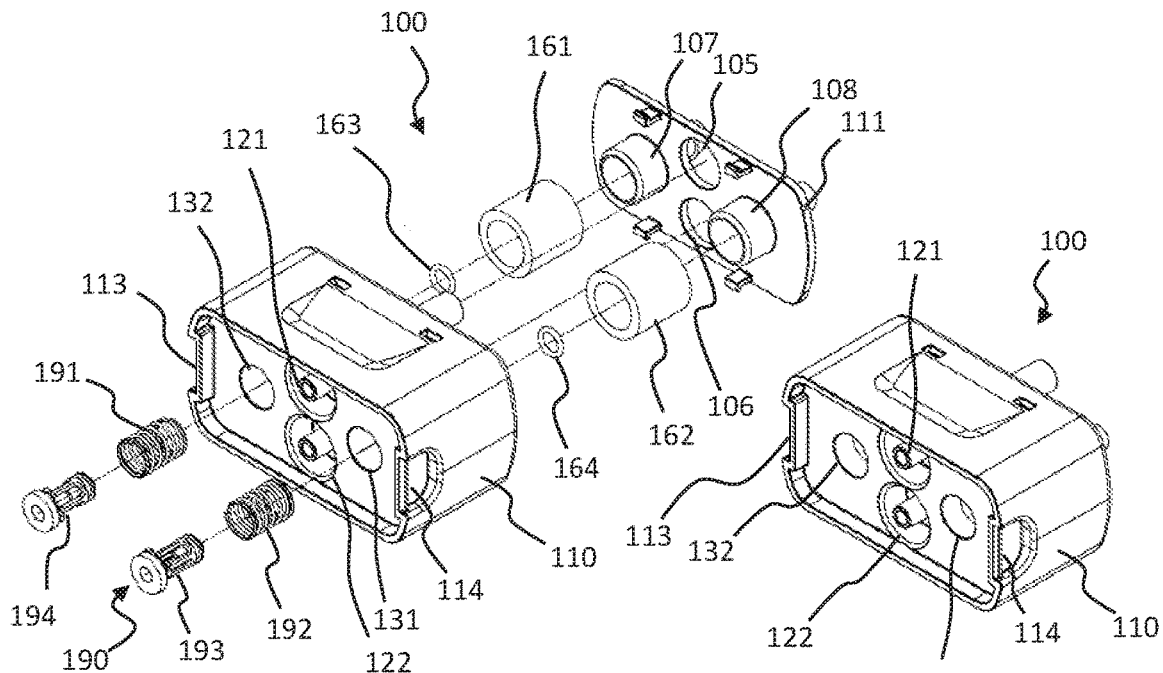
FIG. 6 is perspective views of a mattress connector part of a pneumatic connector assembly according to an embodiment.
Figure 7:
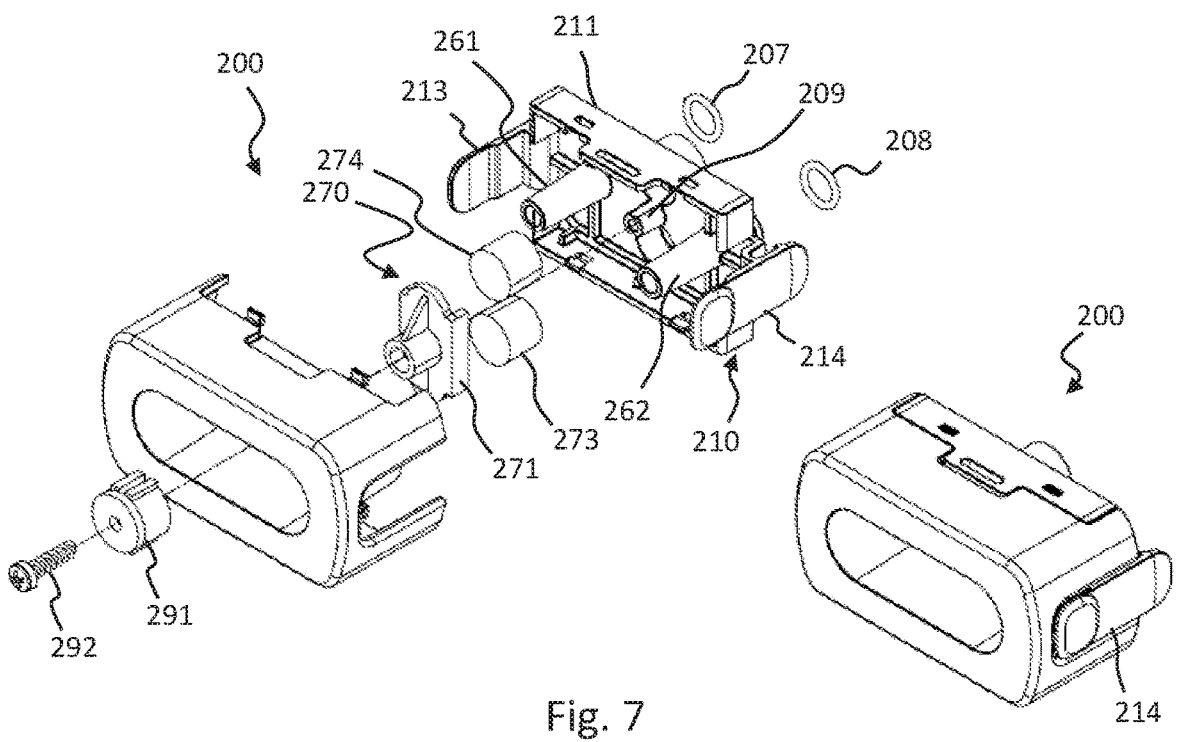
FIG. 7 is perspective views of a pressure source connector part of a pneumatic connector assembly according to an embodiment.
Figure 8:
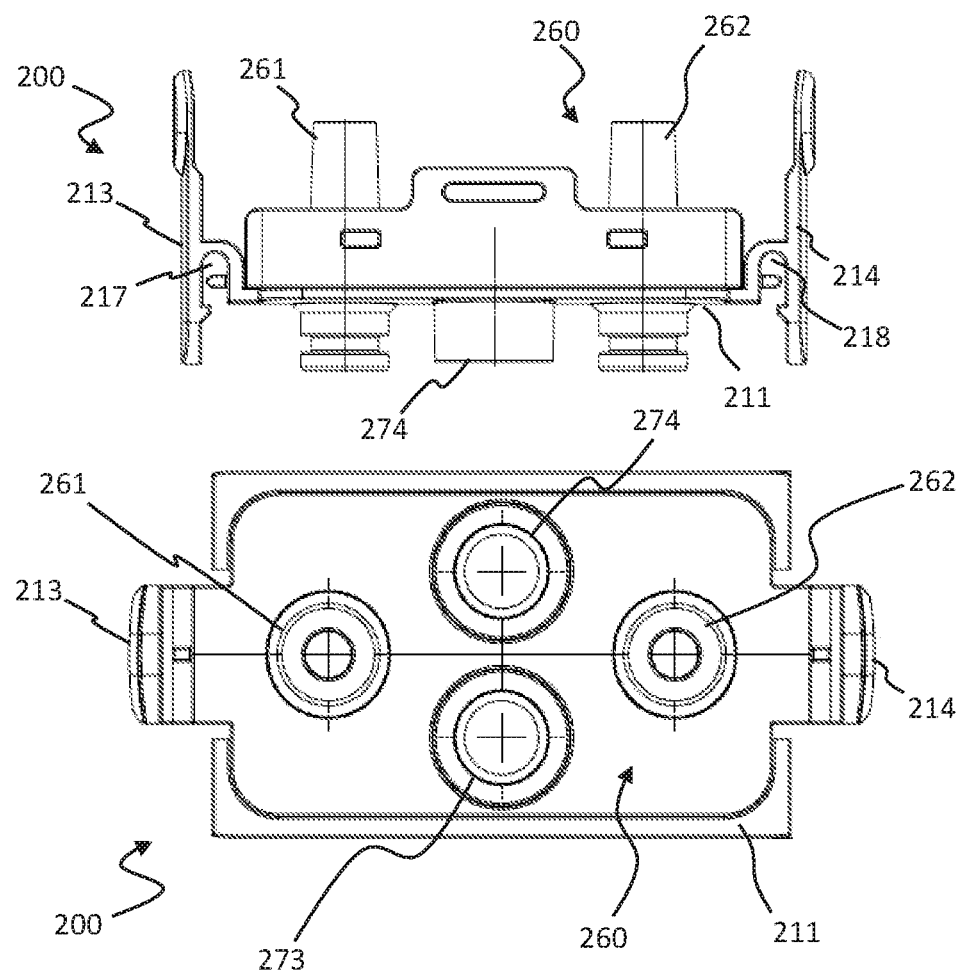
FIG. 8 is top and front view of a pressure source connector part of a pneumatic connector assembly according to an embodiment.

The air supply interface 70 may be any type of conventional air supply interface or an air supply interface according to the present invention as depicted in FIG. 6-8. The air supply interface 70 may comprise a mattress connector part. The first, second, third and fourth mattress port may be provided on the mattress connector part.

As will be described with reference to FIG. 6-8, the inflatable mattress may comprise a valve arrangement arranged to control air supply to and from the third and fourth mattress port 73, 74. The valve arrangement 190 is arranged to control air supply to and from the third and fourth mattress port 73, 74. The valve 190 is actuatable between a sealing position and a non-sealing position.

In the sealing position, the valve arrangement is arranged to seal the third and fourth mattress port 73, 74. In the non-sealing position the valve arrangement is arranged to allow air passage through said third and fourth mattress port 73, 74.

According to an aspect, a patient support apparatus is provided. The patient support apparatus comprises an inflatable mattress according to any of the above embodiments. The patient support apparatus further comprises the pressure source, the pressure source being connected to the third and fourth mattress port 73, 74 for controlling the applied inflation pressure of the plurality of inflatable cells 35 in the second mode. The pressure source may be connected to said mattress ports for controlling the applied pressure to the first and second group of inflatable cells A, B in the second mode. Thus, the pressure source is configured to control the pressure of the inflatable cells and more specifically the first and second group of inflatable cells A, B in the second mode.

In one embodiment, the pressure source 40 comprises a pump system. In one embodiment, the pump system comprises a first pump connected to the third mattress port 73 and a second pump connected to the fourth mattress port 74. In one embodiment, the pressure source 40 comprises a pump connected to the third and fourth mattress port 73, 74.

In one embodiment, the pressure source is configured to, when the inflatable mattress 10 operates in the second mode, alternate between inflating the first group of inflatable cells A with the air discharged from the second group of inflatable cells B and inflating the second group of inflatable cells B with the air discharged from the first group of inflatable cells A.

Thereby a simple manner of achieving an alternating pressure mode is achieved. Furthermore, utilising the air discharged from one group of inflatable cells for inflating another group of inflatable cells substantially improves the pressure relief performance of the inflatable mattress.

In one embodiment, the pressure source is configured to, when the inflatable mattress 10 operates in the second mode, inflate the first group of inflatable cells A for a first set time period and inflate the second group of inflatable cells B for a second set time period. Advantageously, the first and second set time period is between 1 and 10 minutes. More preferably, between 3 and 7 minutes and most preferably approximately 5 minutes.

The operation of the inflatable mattress in the first mode and second mode will be explained briefly below.

In the first mode, wherein the third and fourth mattress port 73, 74 are sealed and no pump is active or connected, the patient's weight will expel a proportional amount of air form the inflatable cells 35. The air is expelled at the second mattress port 72 via the one-direction valves 85, 86, preferably check valves, and flow restricting elements 83, 84 of the exhaust, which reduces the rate of air released and minimizes the pneumatic noise for the inflatable cells 35.

Once the air has been expelled, the one-direction valves 85, 86 of the exhaust close allowing the air circuitry 51, 52 to maintain a fixed positive pressure within the air cells when compared to ambient pressure. As the patient moves on the mattress air is redistributed from air cell to air cell (within each group of cells A and B), minimizing the contact pressure between the patient and the inflatable mattress. When the patient exits the mattress, air is allowed to re-enter inflatable cells 35 through the first mattress port 71 and the one-direction valves 81, 82, preferably check valves, provided at the first mattress port 71. This allows the mattress to equalize the inflatable cells 35 with the external atmospheric pressure.

In the second mode, wherein the first and second mattress port 71, 72 are sealed and a pressure source is connected to the third and fourth mattress port, the pressure source is configured to control the air flow into and out of the first group of inflatable cells A and the second group of inflatable cells B via the third and fourth mattress port 73, 74, respectively.

In the case of the second mode being an alternating pressure mode, the pressure source is configured to inflate the first group of inflatable cells A with air that has been evacuated/discharged from the second group of inflatable cells B or vice versa.

The pressure source is thus configured to generate a suction in one of the third or fourth mattress port 73, 74 to cause air to evacuate the corresponding group of inflatable cells A, B while leading the air evacuated from the corresponding group of inflatable cells A, B via the other of the third or fourth mattress port 73, 74 to the other group of inflatable cells A, B.

Thus, air evacuated from one of the groups of inflatable cells flows via the exhaust to the port onto which the suction is applied, whereby the pressure source feeds the evacuated air into the other port.

This may be performed by means of a single pump of the pressure source being connected to both the ports. The pump being configured to apply both the suction and air intake to the third and fourth mattress port, respectively. The pump or a compressor may thus comprise two pump connections functioning as inlet and outlet of the pump or compressor. The pump is thus configured to apply a positive pressure to the air circuitry via a first connection forming an outlet while applying a negative pressure relative the air circuitry via a second connection forming an inlet (and a negative pressure side of the pump or compressor) and vice versa.

This may also be performed by means of a first pump of the pressure source being connected to the third mattress port 73 and a second pump of the pressure source being connected to the fourth mattress port 74. The first and second being configured to in the second mode alternate between applying a positive and negative pressure on the third and fourth mattress port, respectively. One of the pumps thus functions as a vacuum pump while the other pump generates an air flow into the air circuitry. Accordingly, the first and second pump may each be operatively connected to the controller.

In one embodiment, the inflatable mattress is configured to operate in an automatic passive mode, i.e. a mode wherein the pressure source maintains the pressure of the cells at a substantially constant pressure. Thus, the inflatable mattress 10 is configured to operate in an automatic passive mode in which the first mattress port 71 and the second mattress port 72 are sealed. Further, in the automatic passive mode, air is supplied to and released from the plurality of inflatable cells 35 by means of the third mattress port 73 and fourth mattress port 74. The pressure source is configured to maintain the pressure of the plurality of inflatable cells 35 in the automatic passive mode, i.e. when the inflatable mattress 10 operates in the automatic passive mode, within a set threshold in the plurality of inflatable cells 35.

Thus, the inflatable mattress 10 may be configured to operate in an automatic passive mode in which the first and second mattress port 71, 72 are sealed and wherein the air is supplied to and released from the inflatable cells of the first and second group of inflatable cells A, B by means of the third and fourth mattress port 73, 74. The pressure source 40 when the inflatable mattress 10 operates in the second mode is configured to maintain the pressure within a set threshold in the first and second group of inflatable cells A, B.

In one embodiment, the automatic passive mode may constitute the second mode. In one embodiment, the automatic passive mode constitutes a third mode.

The patient support apparatus may comprise a user interface 47. The pressure applied by the pressure source in the second mode may be set by means of input from said user interface 47. The applied pressure may be based on input comprising the weight of the patient to be supported by the patient support apparatus.

The patient support apparatus may accordingly comprise a controller 46. The user interface 47 may be operatively connected to the controller 46. The controller 46 may be operatively connected to pressure source and configured to control said pressure source. The controller is depicted in FIG. 1.

A method for inflating the inflatable mattress 10 according to the invention will herein be described. The method may comprise switching from the first mode to the second mode by sealing of the first and second mattress port 71, 72 and opening the third and fourth mattress port 73, 74. The method may further comprise supplying air to and releasing air from the plurality of inflatable cells 35 in the second mode via the third and fourth mattress port 73, 74.

Thus, the method may further comprise supplying air to and releasing air from the first and second group of inflatable cells A, B in the second mode via third and fourth mattress port 73, 74.

The step of switching from the first mode to the second mode further comprises actuating the valve arrangement to the non-sealing position to allow air passage through the third and fourth mattress port 73, 74.

In one embodiment, the method further comprises controlling the inflation of the plurality of inflatable cells 35 by means of the pressure source in the second mode.

In one embodiment, the method further comprises controlling the inflation of the first and second group of inflatable cells A, B by means of the pressure source in the second mode.

In one embodiment, the method further comprises setting the applied pressure of the pressure source by means of the user interface 47 of the patient support apparatus.

The method may further comprise switching from the second mode to the first mode by opening the first and second mattress port 71, 72 and sealing the third and fourth mattress port 73, 74.

In one embodiment, the inflation pressure of the plurality of inflatable cells 35 in the first mode is controlled via the first mattress port 71 providing an air inlet from the atmosphere and the second mattress port 72 providing an air outlet to the atmosphere.

Thus, the inflation pressure of the first and second group of inflatable cells A, B may in the first mode be controlled by the first mattress port 71 providing an air inlet from the atmosphere and the second mattress port 72 providing an air outlet to the atmosphere.

Referencing FIG. 6-8, a pneumatic connector assembly for pneumatically coupling a pressure source and an inflatable mattress for controlling the inflation and/or deflation of said inflatable mattress is depicted. The pneumatic connector assembly is suitable for connecting the above described inflatable mattress and pressure source. The pneumatic connector assembly may comprise the air supply interface described with reference to FIG. 2-5.

FIGS. 7 and 8 depicts a pressure source connector part while FIG. 6 depicts a mattress connector part of the pneumatic connector assembly.

The pneumatic connector assembly comprises the pressure source connector part 200. The pressure source connector part 200 is adapted to be connected to the pressure source 40. The pressure source may comprise a pump system, whereby the pressure source connector part may be considered a pump connector part.

The pneumatic connector assembly further comprises the mattress connector part 100. The mattress connector part 100 is adapted to be connected to the inflatable mattress.

The pressure source connector 200 and the mattress connector part 100 are connectable to provide an air pathway through the pneumatic connector assembly in an engaged state, i.e. upon complete connection of the mattress connector 200 and the mattress connector part 100.

As depicted in FIG. 6, the mattress connector part 100 comprises a first mattress connector port 121 and a second mattress connector port 122.

The first mattress connector port 121 is adapted to be connected to a first connection of a first air line of the inflatable mattress. The second mattress connector port 122 is adapted to be connected to a second connection of the first air line of the inflatable mattress.

The first mattress connector port 121 and second mattress connector port 122 are adapted to provide an inlet and outlet to the atmosphere for the first air line when the pneumatic connector assembly is in a non-engaged state.

Further, the mattress connector part comprises a third mattress connector port 131 and a fourth mattress connector port 132. The third mattress connector port 131 is adapted to be connected to a first connection of a second air line of the inflatable mattress. The fourth mattress connector port 132 is adapted to be connected to a second connection of the second air line of the inflatable mattress.

The first and second air line is preferably the first and second air line of the air circuitry described with reference to FIGS. 2-5. The first, second, third and fourth mattress connector port is preferably the first, second, third and fourth mattress port of the air supply interface described with reference to FIGS. 2-5.

As depicted in FIGS. 7 and 8, the pressure source connector part 200 comprises a first pressure source port 261 and a second pressure source port 262. The first pressure source port 261 is adapted to be connected to the third mattress connector port 131. The second pressure source port 262 is adapted to be connected to the fourth mattress connector port 132. Accordingly, said first and second pressure source port are adapted to be connected to said third and fourth mattress connector port when the pneumatic connector assembly is in an engaged state.

The pressure source part further comprises a blocking arrangement 270. In the engaged state of the pneumatic connector assembly, the blocking arrangement is arranged to block the first mattress connector port and second mattress connector port thereby blocking the air pathway to and from the atmosphere.

Thus, the pneumatic connector assembly allows for covering of the first and second mattress connector port while establishing a connection between the pressure source and the third and fourth mattress connector port only by means of connecting the pressure source connector part and the mattress connector part. This allows for controlling of the air intake of the first and second air line of the inflatable mattress in a simple and user-friendly manner.

The third and fourth mattress connector ports 131, 132 and first and second pressure source ports 261, 262 may form a male to female connections in the engaged state. Accordingly, one of the first pressure source port 261 and the third mattress connector port 131 may be provided as a spigot and the other an aperture arranged to receive said spigot in the engaged state. Correspondingly, one of the second pressure source port 262 and the fourth mattress connector port 132 may be provided as a spigot and the other an aperture arranged to receive said spigot in the engaged state.

The pressure source connector part 200 and the mattress connector part 100 may each comprise a housing. The housing is arranged to accommodate the ports of the pressure source connector part 200 and the mattress connector part 100, respectively.

Referencing FIGS. 6-8, the mattress connector part 100 comprises a valve arrangement 190. The valve arrangement 190 is arranged to selectively seal the third mattress connector port 131 and the fourth mattress connector port 132. The pressure source connector part 200 may comprise an engaging arrangement 260. The engaging arrangement 260 is arranged to engage the valve arrangement 190 when the pneumatic connector assembly is in the engaged state to actuate the valve arrangement 190 to provide an open air pathway through the third mattress connector port 131 and the fourth mattress connector port 132.

The valve arrangement seals the third and fourth mattress connector ports when the connector parts are disengaged, whereby leakage through said ports is avoided. Further, the actuation of the valve arrangement allows for simple opening of said ports without any further action than connecting the pressure source to the mattress by means of the connector assembly. Thus, a simple manner of switching the operation of the inflatable mattress between the air lines in the mattress is achieved. Furthermore, this allows for switching between the first mode and second mode previously described with reference to FIG. 2-6 by solely connecting the connector parts.

Preferably, the valve arrangement comprises a first spring loaded valve member 193 arranged in the third mattress connector port 131 and a second spring loaded valve member 194 arranged in the fourth mattress connector port 132. The engaging arrangement 260 is arranged to engage the first and second spring loaded valve member 193, 194 and actuate said spring loaded valve members from a blocking position to a non-blocking position when the pneumatic connector assembly is in the engaged state. The engaging arrangement is thus arranged to push the valve members 193, 194 in an axial direction of the aperture of the port.

The valve members 193, 194 are spring loaded to bias the valve members 193, 194 towards the blocking position.

The engaging arrangement may include the pump connector ports provided as spigots. The spigots may be arranged to engage the spring loaded valve members 193, 194. Thus, upon the spigots engaging the spring loaded valve member 193, 194, said spigots is arranged to engage the spring loaded valve members 193, 194 back thus providing an opening for air to pass through the third and fourth connector port.

In alternative embodiment, the engaging arrangement may comprise engaging members protruding from the pressure source connector part. The engaging members being arranged to engage the valve members in the engaged state of the pneumatic connector assembly.

To ensure proper connection and to secure the parts of the connector assembly when it is in the engaged state, the connector assembly may further comprise an attachment arrangement for attaching the mattress connector part 100 and the pressure source connector part 200 to each other in a retaining manner. The attachment arrangement may thus be arranged to create a semi-permanent latching between the pressure source connector part and the mattress connector part.

The attachment arrangement comprises at least one retaining element 213, 214. The retaining element 213, 214 may be provided on any one of the mattress connector part and pressure source connector part 200. The at least one retaining element is arranged to engage a recess 113, 114 and thereby be retained in the recess 113, 114 when the pneumatic connector assembly is in the engaged state. The recess is provided on the other of the mattress connector part and pressure source connector part 200. The retaining element 213, 214 may be arranged on and protrude from the housing of the pressure source connector part 200 or the mattress connector part 100. The recess 113, 114 may be provided in the housing of the pressure source connector part 200 or the mattress connector part 100.

The attachment arrangement may form a latch. The retaining element 213, 214 may thus preferably be in a resilient material. The retaining element 213, 214 is arranged to resiliently deform inside the corresponding recess 113, 114 thereby forming the latching connection.

Each retaining element 213, 214 may be connected to the housing of the pressure source connector part or the mattress connector part by means of a fulcrum part 217, 218. The fulcrum part is arranged to function as a fulcrum for levering of the retaining element. The recess 113, 114 is arranged to cause the retaining element to tilt about the fulcrum part 217, 218 upon a first end of the retaining element engaging the recess. The retaining element 113, 114 thereby latches onto the recess 113, 114.

To disengage the retaining engagement between the recess 113, 114 and the retaining element 217, 218, the operator may simply press down a second opposite end of the retaining element 213, 214 relative the fulcrum part 217, 218.

As depicted in FIG. 8, the fulcrum part 217, 218 may be formed as a curved portion extending in a direction substantially orthogonal to the retaining element 213, 214.

Preferably, the attachment arrangement comprises a first and second retaining element 213, 214 formed as elongated elements protruding from the housing of the pressure source connector part 200. The elongated elements are arranged to be received by a first and second recess 113, 114, respectively.

To further mitigate the risk for leakage through the first and second mattress connector port, the blocking arrangement 270 may comprise a first blocking member 273 and a second blocking member 274. The first blocking member 273 is arranged to engage the first mattress connector port 121 when the pneumatic connector assembly is in the engaged state. The second blocking member 274 is arranged to engage the second mattress connector port 122 when the pneumatic connector assembly is in the engaged state.

Advantageously, the first and second blocking member may be in an elastic material such as rubber or an elastomeric material. Thus, the first and second blocking member may be pressed into the corresponding connector ports and effectively sealing said connector ports.

According to an aspect, a patient support apparatus is provided. The patient support apparatus comprises the inflatable mattress according to any of the previously described embodiments and the pneumatic connector assembly. The inflatable mattress may comprise a plurality of inflatable cells interconnected by means of the first and/or second air line.

The pressure source connector part is thus directly connected to the pressure source and the mattress connector part is thus directly connected to the inflatable mattress. The pressure source connector part may be pneumatically connected to the pressure source. The mattress connector part may be pneumatically connected to the inflatable mattress.

With the above described pneumatic connector assembly switching between the first and second mode may be performed by means of setting the pneumatic connector assembly. Accordingly, the method for inflating the inflatable mattress may further comprise switching from the first mode to the second mode by connecting the pump connector part to the mattress connector part thereby achieving the engaged state of the pneumatic connector assembly and thereafter supplying air to and releasing air from the plurality of inflatable cells, i.e. the first and second group of inflatable cells, in the second mode via the third and fourth mattress port 73, 74.

The invention has been described above in detail with reference to embodiments thereof. However, as is readily understood by those skilled in the art, other embodiments are equally possible within the scope of the present invention, as defined by the appended claims.

The invention claimed is:

1. A pneumatic connector assembly for pneumatically coupling a pressure source and an inflatable mattress for controlling the inflation and/or deflation of said inflatable mattress, the pneumatic connector assembly comprising a pressure source connector part adapted to be connected to the pressure source, and a mattress connector part adapted to be connected to the inflatable mattress,
wherein the pressure source connector part and the mattress connector part are connectable to provide an air pathway through the pneumatic connector assembly in an engaged state,
wherein the mattress connector part comprises:
a first mattress port connected to an inlet of an air circuitry of the inflatable mattress, and a second mattress port connected to an exhaust of the air circuitry, and
a third mattress port connected the air circuitry and a fourth mattress port connected to the air circuitry,
wherein the connector assembly is configured to operate in:
a first mode in which the third and fourth mattress port are sealed and wherein air is supplied to and released from the inflatable mattress by means of the first and second mattress port, and
a second mode in which the first and second mattress port are blocked and wherein air is supplied to and released from the inflatable mattress by means of the third and fourth mattress port by the co-joining of pressure source connector,
wherein the air circuitry comprises a first air supply line interconnecting a first group of inflatable cells of the inflatable mattress and a second air supply line interconnecting a second group of inflatable cells of the inflatable mattress, and
wherein the first mattress port is connected to an inlet of the first air supply line and an inlet of the second air supply line, the second mattress port is connected to an exhaust of the first and second air supply line, the third mattress port is connected to the first air supply line, and the fourth mattress port is connected to the second air supply line, whereby the air is supplied to the inflatable cells of the first and second group of inflatable cells in the first mode by means of the first mattress port, and whereby the air is released from the inflatable cells of the first and second group of inflatable cells in the second mode by means of the third and fourth mattress port.

2. The pneumatic connector assembly according to claim 1, wherein the pressure source part comprises a blocking arrangement arranged to block the first and second mattress port in the second mode.

3. The pneumatic connector assembly according to claim 1, wherein the mattress connector part comprises a valve arrangement arranged to selectively seal the third and fourth mattress connector port in the first mode.

4. The pneumatic connector assembly according to claim 1, wherein the mattress connector part comprises a valve arrangement arranged to selectively seal the third and fourth mattress connector port, and
wherein the pressure source connector part comprises an engaging arrangement arranged to engage the valve arrangement when the pneumatic connector assembly is in the engaged state to actuate the valve arrangement to provide an open air pathway through the third and fourth mattress connector port.

5. The pneumatic connector assembly according to claim 4, wherein the valve arrangement comprises a first and second spring loaded valve member arranged in the third and fourth mattress connector port, respectively, whereby the engaging arrangement is arranged to engage the first and second spring loaded valve member and actuate said spring loaded valve members from a blocking position to a non-blocking position when the pneumatic connector assembly is in the engaged state.

6. The pneumatic connector assembly according to claim 1, wherein said first mattress connector port is adapted to provide an inlet and outlet to the atmosphere for the first air supply line when the pneumatic connector assembly is in a non-engaged state, and
wherein the pressure source connector part comprises:
a first pressure source port,
a second pressure source port adapted to be connected to the third mattress connector port and fourth mattress connector port, respectively, and
a blocking arrangement which in the engaged state of the pneumatic connector assembly is arranged to block the first mattress connector port and second mattress connector port thereby blocking the air pathway to and from the atmosphere.

7. A patient support apparatus comprising:
a pressure source;
an inflatable mattress; and
a pneumatic connector assembly according to claim 1,
wherein the inflatable mattress comprises a plurality of inflatable cells interconnected by means of the first air supply line and/or the second air supply line.

8. A method for inflating the inflatable mattress of the patient support apparatus according to claim 7, wherein the method comprises:
switching from the first mode to the second mode by blocking of the first and second mattress port and opening the third and fourth mattress port, and
supplying air to or releasing air from the inflatable mattress in the second mode via the third and fourth mattress port.

9. The method according to claim 8, further comprising controlling the inflation of the inflatable mattress by means of the pressure source in the second mode.

10. The method according to claim 9, wherein the step of switching from the first mode to the second mode further comprises actuating the valve arrangement to the non-sealing position to allow air passage through the third and fourth mattress port, and
wherein the method further comprises switching from the second mode to the first mode by opening the first and second mattress port and sealing the third and fourth mattress port.

11. The method according to claim 8, wherein the step of switching from the first mode to the second mode further comprises actuating the valve arrangement to the non-sealing position to allow air passage through the third and fourth mattress port.

12. The method according to claim 8, further comprising switching from the second mode to the first mode by opening the first and second mattress port and sealing the third and fourth mattress port.

13. The method according to claim 8, wherein an inflation pressure of the inflatable mattress in the first mode is controlled via the first mattress port providing an air inlet from the atmosphere and the second mattress port providing an air outlet to the atmosphere.

\* \* \* \* \*